United States Patent
Reid et al.

(10) Patent No.: US 7,136,403 B2
(45) Date of Patent: Nov. 14, 2006

(54) CRYSTAL MOUNTING IN SOLID STATE LASER SYSTEMS

(75) Inventors: Philip George Reid, Nedlands (AU); Hank Christian Sciberras, Joondanna (AU); Zheng Lin Wang, Glendalough (AU); Geoffrey Thomas Dair, Subiaco (AU)

(73) Assignee: Q-VIS Limited, Western Australia (AU)

( * ) Notice: Subject to any disclaimer, the term of this patent is extended or adjusted under 35 U.S.C. 154(b) by 225 days.

(21) Appl. No.: 10/399,562

(22) PCT Filed: Oct. 19, 2001

(86) PCT No.: PCT/AU01/01341

§ 371 (c)(1),
(2), (4) Date: Dec. 22, 2003

(87) PCT Pub. No.: WO02/33484

PCT Pub. Date: Apr. 25, 2002

(65) Prior Publication Data

US 2005/0163173 A1 Jul. 28, 2005

(30) Foreign Application Priority Data

Oct. 19, 2000 (AU) .................................... PR0875

(51) Int. Cl.
*H01S 3/10* (2006.01)

(52) U.S. Cl. ...................... 372/22; 372/21; 359/326
(58) Field of Classification Search .................. 372/21, 372/22; 359/326

See application file for complete search history.

(56) References Cited

U.S. PATENT DOCUMENTS

| 4,019,159 | A |   | 4/1977  | Hon et al. |
| 4,884,277 | A |   | 11/1989 | Anthon et al. |
| 4,933,947 | A |   | 6/1990  | Anthon et al. |
| 5,031,182 | A |   | 7/1991  | Anthon et al. |
| 5,144,629 | A |   | 9/1992  | Basu |
| 5,634,922 | A | * | 6/1997  | Hirano et al. .................. 606/10 |
| 5,652,757 | A | * | 7/1997  | Okazaki et al. ................ 372/22 |
| 5,671,232 | A |   | 9/1997  | Lee et al. |
| 6,191,385 | B1 | * | 2/2001 | O Loughlin et al. .... 219/121.83 |
| 6,251,101 | B1 | * | 6/2001 | Glockler ......................... 606/5 |
| 6,532,100 | B1 | * | 3/2003 | Partanen et al. ............ 359/326 |
| 6,723,977 | B1 | * | 4/2004 | Fukumoto .................... 250/216 |

FOREIGN PATENT DOCUMENTS

| AU | 3006/89     | 8/1989 |
| JP | 10153806 A  | 6/1998 |

\* cited by examiner

*Primary Examiner*—Minsun Oh Harvey
*Assistant Examiner*—Dung (Michael) T. Nguyen
(74) *Attorney, Agent, or Firm*—Merchant & Gould P.C.

(57) ABSTRACT

Crystal housing apparatus for adjustably positioning cooperating non-linear optical crystals in a laser beam generating system, includes a housing (50) with entry (60) and exit (62) windows for respective laser beams, respective holder means (72, 74, 76) to retain respective crystals within the housing in optical alignment with the windows, and means (86) mounting the respective holder means for individual fine rotational adjustment of the crystals about respective axes. Individual temperature control elements (120) are mounted in association with the respective holder means for controlling the temperature of the respective crystals and means (110, 114) is provided for effecting the fine rotational adjustment of the crystals.

54 Claims, 6 Drawing Sheets

CRYSTAL MOUNTING IN SOLID STATE LASER SYSTEMS

FIELD OF THE INVENTION

This invention relates generally to the mounting of frequency conversion crystals in solid state laser systems, and as such has particular though not exclusive application in solid state laser systems for generating laser beams of wavelengths suitable for photo-ablation of materials. Such laser beams have widespread application in the surgical and medical fields, including operations for correcting refractive errors of the eye.

BACKGROUND ART

Excimer gas lasers remain the principal laser system of choice for refractive eye surgery by photo-ablation, in which corneal eye issue is vaporised while causing little or no thermal damage to adjacent areas. Notwithstanding their widespread use, excimer lasers have a number of inherent disadvantages, including large size and high operating and maintenance costs, and reliance on an extremely toxic gas that must be regularly replaced. Excimer lasers have an operating wavelength of 193 nm, in the ultraviolet region of the electromagnetic spectrum.

Alternative, solid state laser systems have been proposed for generating an ultraviolet laser beam, suitable for corneal ablation, by frequency conversion of the output of an infra-red solid state laser, such as the widely used Neodymium:YAG laser. The Nd:YAG laser produces a wavelength of 1064 nm, and this output beam is directed through a sequence of non-linear optical (NLO) crystals to derive an appropriate harmonic in the ultraviolet region by a process known as harmonic generation. Such systems are generally described in, eg U.S. Pat. Nos. 5,144,630 and 5,592,325. International patent publication WO 99/04317 discloses a solid state laser system in which an Nd:YAG laser beam is passed in sequence through a crystal of bet barium borate (B—$BaB_2O_4$ or BBO) and a pair of crystals of caesium lithium borate ($CsLiB_6O_{10}$ or CLBO) to generate the fifth harmonic of the Nd:YAG laser output at 213 nm, which has been found to be especially suitable for refractive surgery by photo-ablation. This harmonic ha also been produced using three BBO crystals (Lago et, 1988, Optics Letters 13 (3): 221–223).

The aforementioned International patent publication WO 99/04317 and related U.S. continuation-in-part application Ser. No. 09/484777 disclose arrangements for mounting the frequency conversion crystals in hermetically sealed housings with in-built heater elements for maintaining the crystals at optimum temperatures, which is important for the stability of the frequency conversion process. In one embodiment, the two CLBO crystals are mounted together in optical contact in the one housing, while in the other they are mounted in separate housings. The present applicant has found that solid state laser systems arranged in this way have produced a satisfactory 213 nm ultraviolet laser beam suitable for photo-ablation of biological tissues such as corneal tissue. However, improvement in stability and uniformity of the beam would be advantageous. There has also been an observed degradation of the crystals at a rate which would not be acceptable in a practical commercial system.

To address small fluctuations in the direction of the laser beam as it emerges from the crystal, European patent publication 1 041 427 discloses a crystal holder fitted with "beam passage components" adjacent the incident and exit faces of the CLBO crystal to reduce localised air shimmer arising from the crystal heating system. In another arrangement disclosed in European patent publication 1 048 974, which is also concerned with reducing crystal interface degradation, elongate hermetically sealed spaces extend from the respective crystal housing windows, and these spaces are filled with high purity oxygen or a gas mixture of high purity oxygen and an inert gas.

This invention is primarily directed to the provision of solid state laser systems of enhanced beam stability and uniformity, and with a longer crystal life than presently observed.

SUMMARY OF THE INVENTION

It has been appreciated, in accordance with the invention, that at least partial resolution of the aforementioned difficulties lies in the provision of a facility for fine adjustment of the orientations of the frequency conversion crystals. Furthermore, there is advantage in providing for the separate mounting and angular adjustment of each of the crystals employed, and additional benefit can also be obtained by providing for automatic feedback control of crystal rotational positions responsive to monitoring of the energy or other parameter of the desired beam.

The invention accordingly provides, in a first aspect, crystal housing apparatus for adjustably positioning cooperating non-linear optical crystals in a laser beam generating system. The apparatus includes a housing with entry and exit windows for respective laser beams, and respective holder means to retain respective crystals of a plurality of the crystals within the housing in optical alignment with the entry and exit windows. Means is provided mounting each of the respective holder means for individual fine rotational adjustment of each of the crystals about respective axes that preferably substantially intersect the optical alignment individual temperature control elements are mounted in association with the respective holder means for individually controlling the temperature of the respective crystals, and there is means for effecting the aforesaid fine rotational adjustment of the crystals.

The means for effecting said fine rotational adjustment of the crystals may be respective manual means, or alternatively may be respective electrically powered drive means such as a stepper motor under computer control.

The holder means preferably include means for clamping the crystal in at least two directions, most preferably one perpendicular to the optical alignment and the other substantially coaxial with or at least parallel to the optical alignment. The clamping means is advantageously arranged to minimise stress on the crystal and preferably to distribute the clamping force over a large area of the crystal.

The housing is preferably an at least dust-sealed housing, and may be hermetically sealed, with means to substantially fill the housing with a suitable dry or inert gas.

Preferably, there are three holder means in an arrangement for providing three crystals for deriving, from an infra-red beam, an ultra-violet beam, eg around 213 nm, suitable for photo-refractive ablation of biological tissue. An especially effective arrangement is a BBO crystal followed by two CLBO crystals, in which the axis about which said rotational adjustment is made for the middle (CLBO) crystal extends orthogonally with respect to the other two axes of adjustment, and both of these axes are orthogonal to the optical alignment. Alternative crystal arrangements are possible and envisioned by the present invention. In a second aspect, the invention is directed to a laser beam generation system, that includes laser means for generating a primary laser beam, crystal housing apparatus according to the first aspect of the invention, and means to direct the primary laser beam along the optical alignment. The crystals are arranged to generate one or more derived laser beams by frequency conversion of the primarily beam. The system further includes means to monitor the energy or other parameter of at least one of the derived laser beams. At least one of the means mounting each of the respective holder means and the temperature control elements is responsive to effect the rotational adjustment and/or the temperature control in response to the monitoring means for optimising the monitored energy or other parameter.

In its second aspect, the invention further provides a method of generating a laser beam, including:

generating a primary laser beam;

directing said primary laser beam along an optical alignment traversing a plurality of non-linear optical crystals arranged to generate one or more derived laser beams by frequency conversion of said primary beam;

maintaining the temperature of the crystals;

monitoring the energy or other parameter of at least one of said derived laser beams; and finely individually adjusting the temperature of one or more of said crystals, and/or finely individually rotationally adjusting one or more of said crystals about respective axes that preferably substantially intersect said optical alignment, in either case for optimising said monitored energy or other parameter.

The optimisation of said monitored energy may be in relation to a value of the energy, eg to achieve and maintain peak energy, or to the spatial profile of the beam or both.

In a preferred embodiment of the second aspect of the invention, the method further includes maintaining said crystals at a temperature between 0 and 30° C. different from the mean operational temperature, immediately prior to directing the primary laser beam along said optical alignment, and adjusting said temperature and/or effecting said individual rotational adjustment, to compensate for initial heating of the crystals by said primary laser beam.

Said crystals may generate said one or more derived laser beams as a predetermined harmonic or harmonics of the primary laser beam.

Advantageously, means is further provided for adjusting the primary laser beam in dependence upon said monitored energy or the other parameter, eg by adjusting one or more of the cross-section or diameter of the primary laser beam, the laser beam energy, the duration of each laser beam pulse, and the repetition rate of the primary laser beam.

An advantageous embodiment of the invention incorporates both aspects of the invention, eg the crystal housing apparatus of the first aspect as the harmonic conversion means and adjustment means of the second aspect. In a particularly advantageous embodiment, the apparatus of invention, in its first and/or second aspects, is provided as part of laser ablation apparatus, eg apparatus for performing refractive eye surgery by photo-ablation of corneal or other eye tissue.

Preferably, some or all of the materials of components of the apparatus are selected from materials that substantially do not give off gas when hit by the laser beam(s) or by reflections of the beam(s).

BRIEF DESCRIPTION OF DRAWINGS

The invention will now be more fully described, by way of example only, with reference to the accompanying drawings, in which.

PREFERRED EMBODIMENTS

Figure 1:
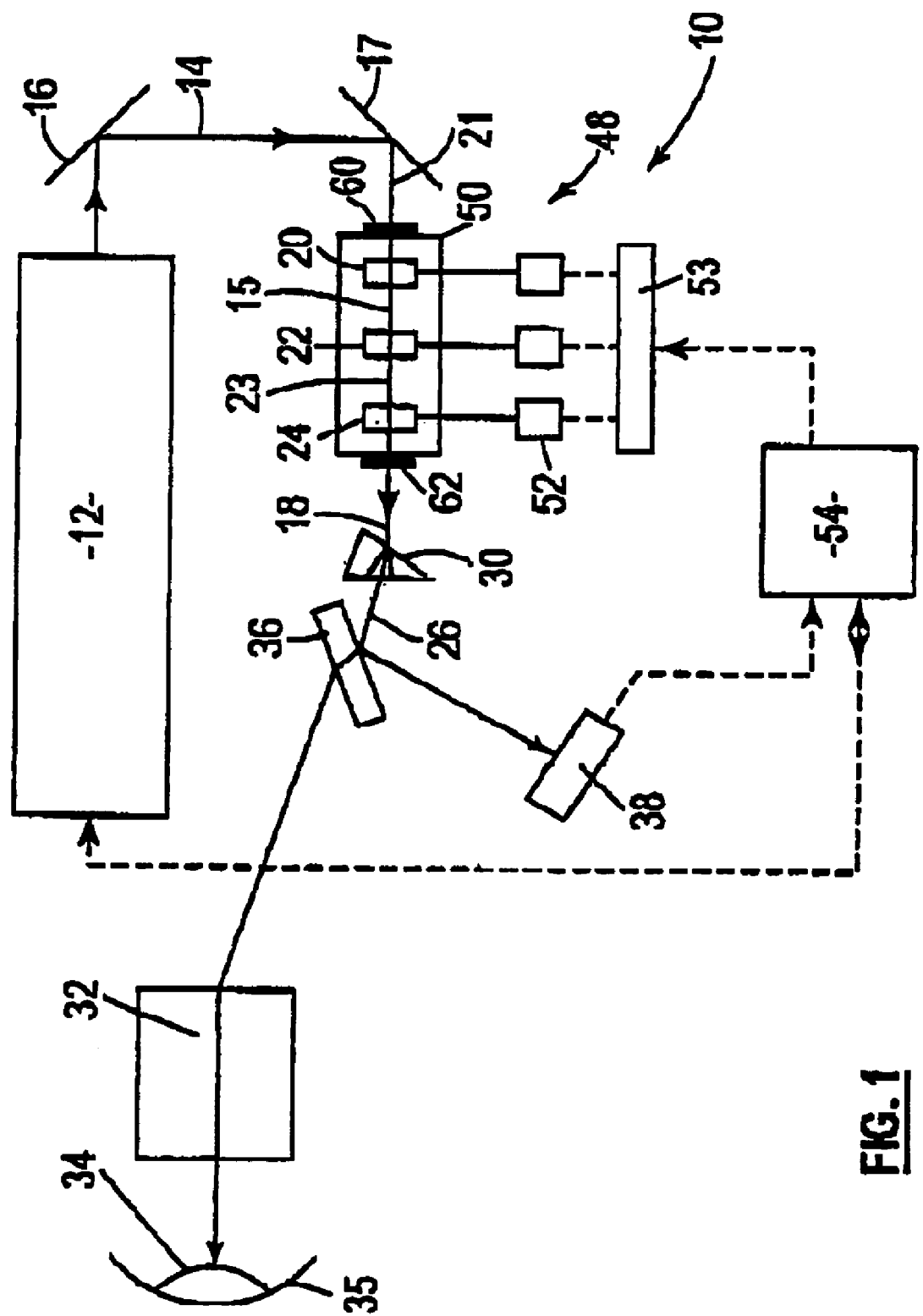
FIG. 1 is an optical diagram of a laser beam generation system incorporating embodiments of the first and second aspects of the invention.
Figure 2:
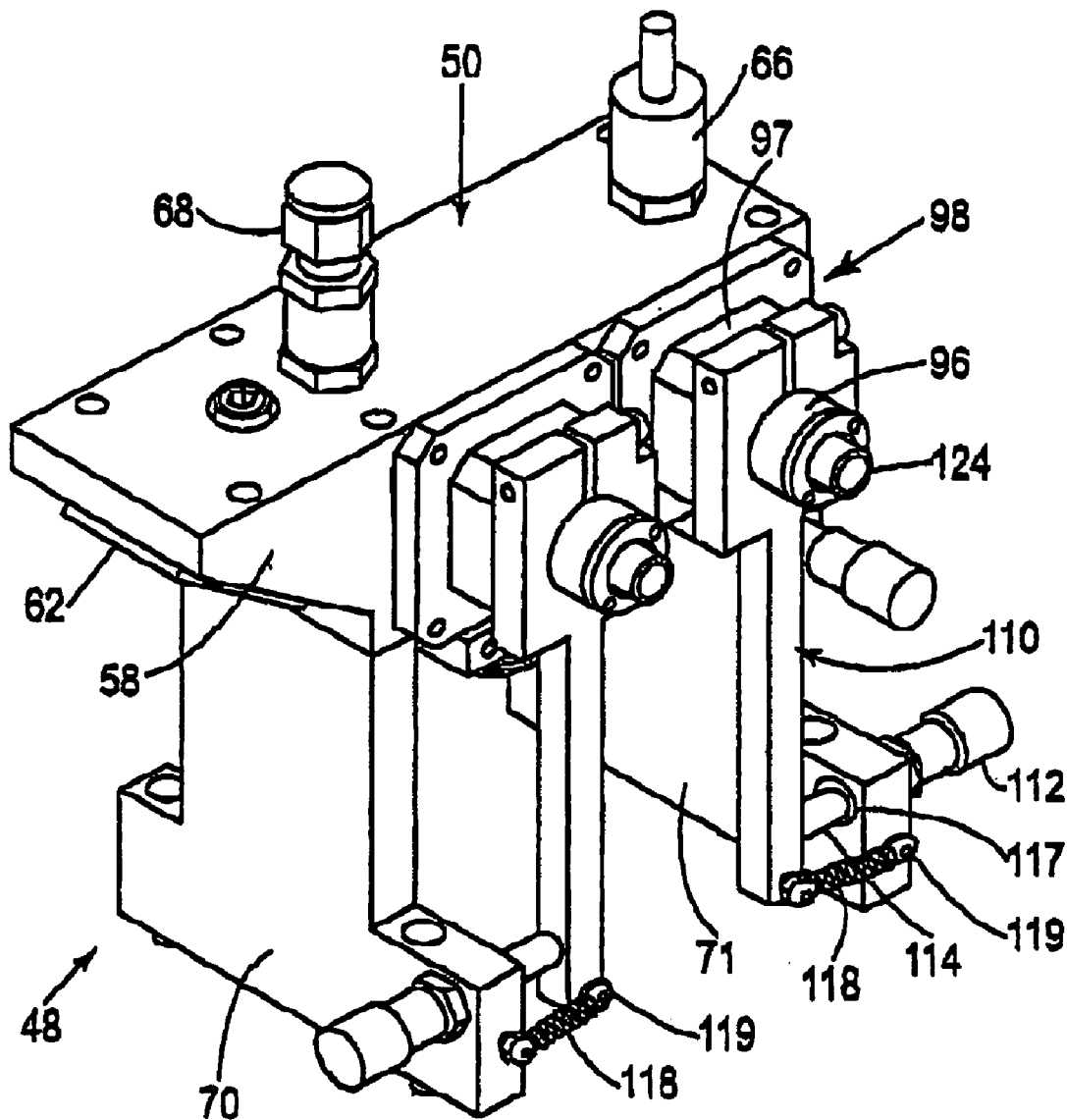
FIG. 2 is a perspective view of the crystal housing apparatus of the laser beam generating system of FIG. 1, which apparatus is an embodiment of the first aspect of the invention.
Figure 4:
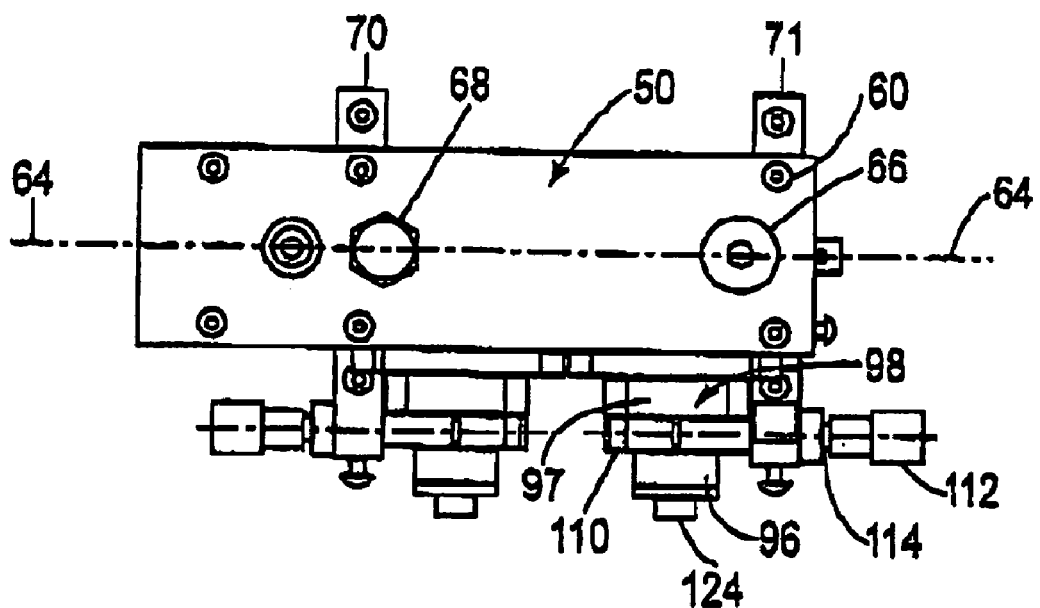
FIGS. 3 and 4 are respectively a front elevation and a plan view of the crystal housing apparatus of FIG. 2.
Figure 3:
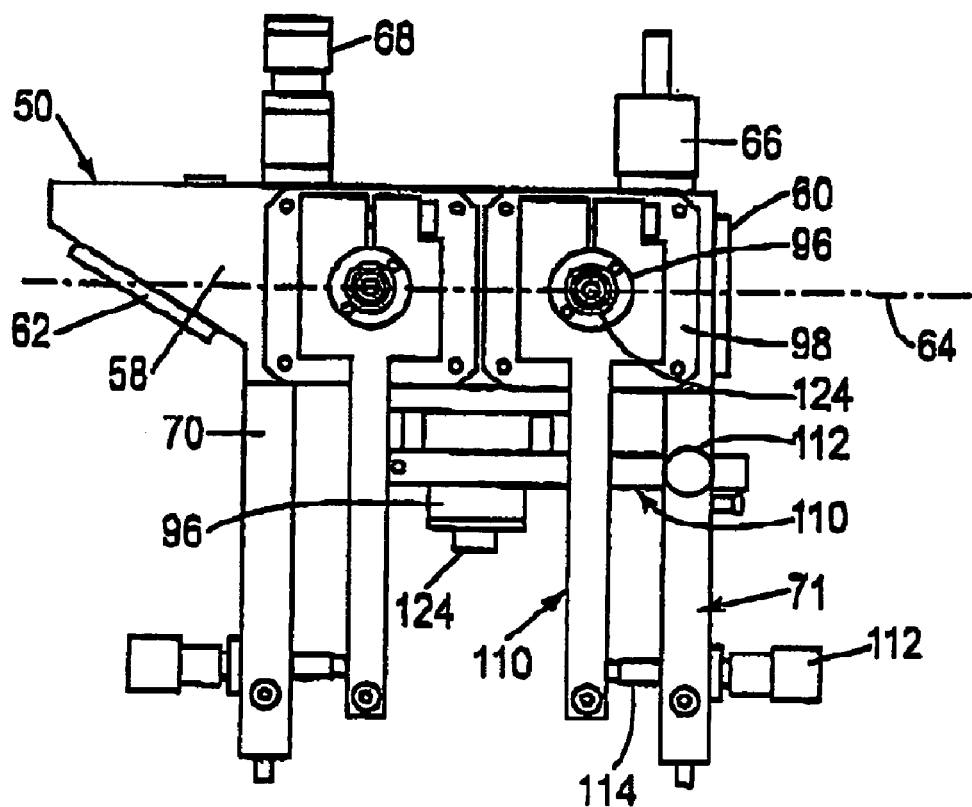
Figure 5:
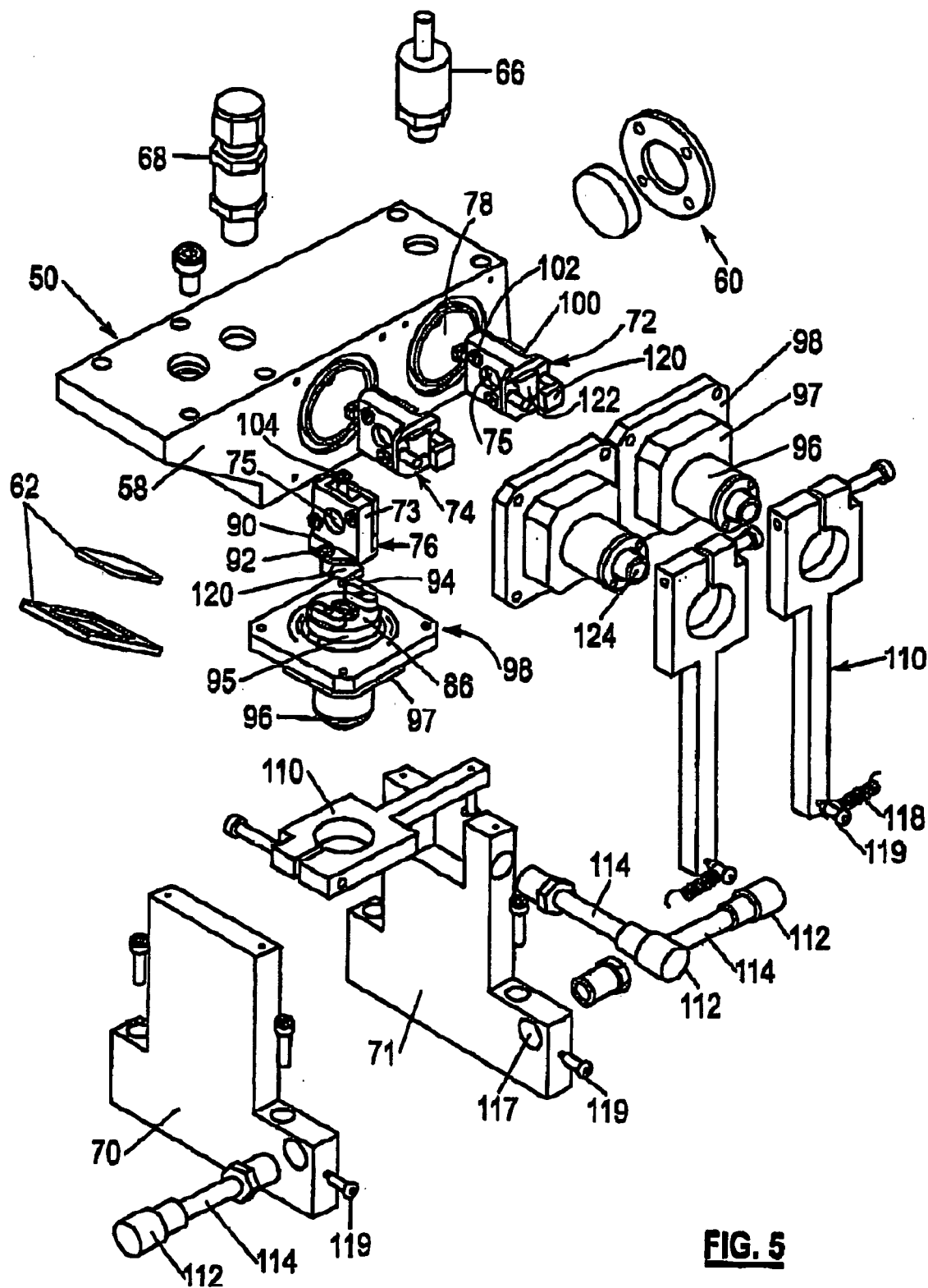
FIG. 5 is an exploded view of the crystal housing apparatus.

An optical diagram for a laser beam generation system 10 in accordance with the first aspect of the invention is depicted in FIG. 1. The system 10 includes a solid state laser 12 that emits a primary laser beam 14 in the infra-red region of the electromagnetic spectrum. Primary laser beam 14 is guided by optical elements, in this case mirrors 16, 17, along an optical alignment or axis 21, through a series of non-linear optical (NLO) crystals 20, 22, 24 from which emerges a multi-component output beam 18. Beam 18 comprises the original beam 14 and several harmonics generated by crystal 20, 22, 24. The desired harmonic 26 is separated out by a prism 30, or a dichroic mirror arrangement.

In an application for refractive eye surgery by photo-ablation, beam 26 is directed by a beam delivery system 32 onto the cornea 34 of an eye 35.

A small portion of component beam 26 is diverted by a beamsplitter 38 to a photo-detector 38 such as a photodiode for measuring and monitoring the energy of beam component 26.

NLO crystals 20, 22, 24 are mounted within a dust-sealed protective housing 50 of crystal housing apparatus 48 of the form illustrated in FIGS. 2 to 5, except that this depicted form of housing apparatus 48 provides for independent fine rotational adjustment of each crystal by manual means: in the arrangement of FIG. 1, the rotational position of each crystal is incrementally adjustable (in a manner to be further described) by individual stepper motors 52 in response to digital signals from a controller 54. Controller 54, typically a computer system, also controls the output beam parameters of laser 12. In accordance with a preferred practice of the first aspect of the invention, adjustment of the crystal rotational positions and of the laser output parameters are effected in response to the ongoing monitoring of the energy of laser beam component 26 at photodetector 38.

A particularly suitable laser 12 is a Q-switched neodymium:YAG laser producing a 2–10 mm pulsed laser beam 14 of fundamental wavelength 1064 nm. The beam 14 is collimated, resulting in a collimated harmonically generated beam downstream. Pulse energies for the fundamental wavelength typically range from 30 to 1000 mJ per pulse. A variety of other laser sources are suitable but preferred sources are $Nd^{3+}$ doped laser media such as Nd:YLF, Nd:glass and $Nd:YVO_4$.

A particularly convenient crystal set 20, 22, 24 is as disclosed in International patent publication WO 99/04317. In this configuration, crystal 20 is a BBO crystal that uses type I or type II phase matching as a frequency doubling unit to generate a frequency doubled beam 15 of second harmonic wavelength 532 nm. Instead of a BBO crystal, crystal 20 may alternatively be KTP, LBO, KD*P or any other suitable NLO crystals. The other two crystals 22, 24 are preferably CLBO crystals although other suitable crystals include BBO, and KD*P and related isomorphs. Crystal 22 converts frequency doubled beam 15 at 532 nm to a beam 23 of 4th harmonic wavelength 266 nm, utilising type I phase matching. In crystal 24, beam components 15 and 23, of fundamental and fourth harmonic wavelengths respectively, are frequency mixed to produce a laser beam component 26 of the fifth harmonic wavelength, 213 nm. This is effected by means of sum frequency generation, a type I phase matching interaction.

Further details of this process and of the crystals themselves are to be found in the aforementioned international patent publication, the disclosure of which is incorporated herein by reference.

Attention is now turned to the matter of optimum orientation of the crystals 20, 22, 24.

The polarisation of the input light and the non-linear interaction type determine the necessary axis of rotation of the non-linear crystals. Each conversion stage in generating the fifth harmonic wavelength employs a Type I interaction within the crystal. Therefore, each input wave behaves as an ordinary wave, while each newly generated wavelength is an extraordinary wave. For example, a vertically polarised input wave will generate a horizontally polarised harmonic wave. This requires that each subsequent crystal must have an axis of rotation perpendicular to that of the previous crystal. In the first preferred embodiment, the fundamental light polarisation is in the horizontal plane. The axis of rotation for the first, second and third crystal respectively is horizontal, vertical and horizontal. In the second preferred embodiment, the fundamental light polarisation is in the vertical plane and the axis of rotation for the first, second and third crystal respectively is vertical, horizontal and vertical.

It will of course be understood that where different crystals are used, different phase matching orientations and directions of rotation may be required.

Stepper motors 52 advance in discrete steps and are used to rotationally position the crystals with respect to each other and to the incoming laser beam. A stepper motor control board 53 accepts control information from the laser system controller 54 (typically a computer), and converts this to direction or position information, which is used to drive stepper motors 52 in incremental steps. An electronic control unit in each motor actuates motor 52 in either direction of rotation, to maximise the output of the respective crystal.

During the adjustment procedure the laser system controller 54 monitors the fifth harmonic output energy read at photo-detector 38. The alignment system steps through the first, second and third crystals to optimize the fifth harmonic energy or stability. Each crystal is moved in sequence from an initial position back to a nominal starting point. Each crystal is individually advanced past the peak point of energy output, returned to the starting point and then progressed forward until energy output approaches the peak point (detected an the first pass through). During auto-tuning the motors may approach the final position from the same direction to eliminate the effect of any mechanical backlash in the system. Alternatively, a picture of the energy profile may be obtained and the most stable point (where the least variation of energy occurs over a range of angles), rather than the peak energy, may be used to optimise the energy output.

Reverting now to FIGS. 2 to 5, crystal housing apparatus 48 and its associated crystal orientation adjustment mechanism will be described in detail.

Housing 50 is generally elongate and of largely rectangular cross section, extending from a laser entry window 60 at one end to an exit window 62 at the other. The centre line connecting the windows defines the optical alignment or optical axis 64 of the housing. The entry window 60 consists of a coated BK7 or coated fused silica substrate, while exit window 62 consists of an uncoated Suprasil (fused silica) substrate that is fixed relative to optical axis 64 on the Brewster angle for 213 nm incident light. Light reflected from exit window 62 is deflected to a beam dump (not shown). Appropriate fittings 66, 68 are provided for admitting an inert gas to fill the enclosure of housing 50 and for expelling air or other gas therein. One of these fittings 68 includes a check valve.

Housing 50 is supported atop a pair of generally upright planar posts 70, 71 provided with appropriate framework for supporting the housing and associated crystal orientation adjustment mechanism.

Crystals 20, 22, 24 are supported in holders 72, 74, 76 which project cantilever-like into the interior of housing 50 from respective mountings 86 that are fitted in respective aperture 78 in one of the side walls 55 of housing 50 and in the bottom wall 59. All of the holder/mounting units are of similar construction and it is therefore proposed to describe only one of them, holder 60, in detail, with particular reference to FIGS. 5 and 6.

Holder 76 is an integral generally rectangular body 73 with a pair of oppositely directed base flanges 90 by which the holder is fastened, using screws 92, onto respective diametrically opposite heat insulating cleats 94, eg of Teflon or a suitable ceramic, on a base disc 95. Disc 95 is at the end of a stepped boss 96 that is rotatably supported within a bearing 97 of a closure assembly 98 fastened to the outside face of wall 59. Space-grade encapsulant (Dow Corning 93-500) 'O' rings may be used to seal this interface hermetically, if desired.

Figure 6:
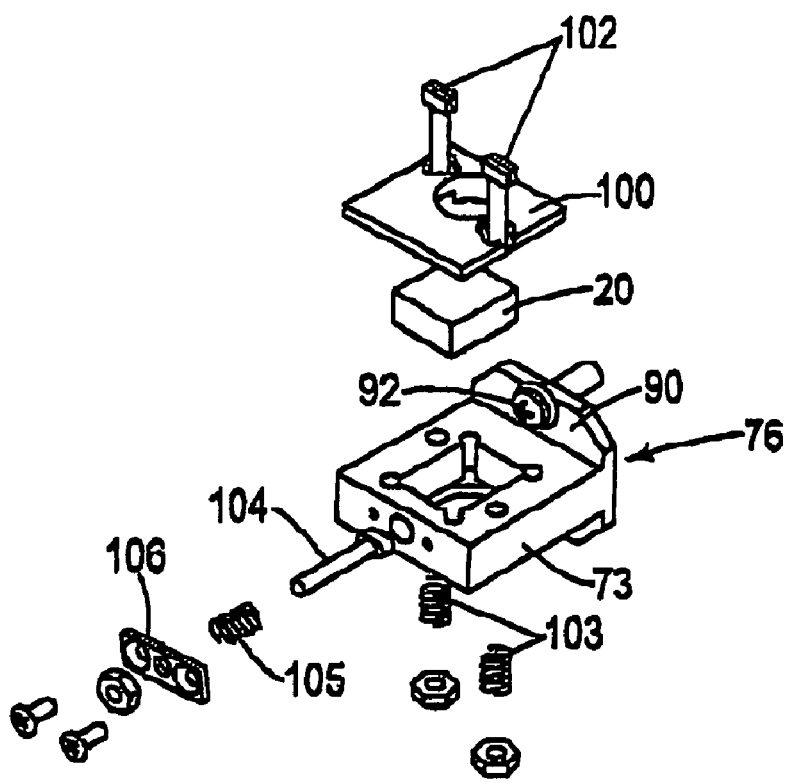
FIG. 6 is an exploded view of the holder arrangement for retaining each crystal in position.

Crystal 20 is clamped in place in a generally rectangular opening 75 behind a ceramic front plate 100 by thumb screws 102 that carry helical compression springs 103 (FIG. 6). This effects mechanical clamping in a direction parallel to the optical axis, and further clamping is effected in a direction perpendicular to the beam by a T-stud 104 with a spring 105 braced by a crosspiece 106. This holder arrangement is designed to fix the respective crystals accurately in place. The clamping mechanisms are spring-loaded and provide a very low clamping force, and also distribute the clamping force over a large area of the crystal, ensuring that stress on the crystal is kept to an absolute minimum. Ceramic front plate 100 is selected to absorb any scattered or diffuse radiation safely and without generating gases or contaminants which might damage the crystals.

Externally of housing 50, each boss 96 is clamped within a bifurcated lever 110. In the manual version illustrated, fine rotational movement of this lever, and thereby of boss 96 and crystal 20, is effected by rotation of the head 112 of a threadingly mounted stud 114 that contacts a side face of lever 110 at a position remote from the axis of rotation of boss 96. The stud 114 is threadingly mounted in a matching aperture 117 adjacent one corner of one of the posts 70, 71. Stud 114 drives the lever in one direction of rotation, while the lover retracts in contact with the stud for the other direction of rotation by virtue of the helical extension spring 118 mounted between lugs 119 on the lever 110 and on post 70 or 71. In the fully automated control system of FIG. 1, studs 114 are incrementally rotated by stepper motors 52 under the control of the digital signals supplied from controller 54 via stepper motor control board 53. In an alternative arrangement, provision may be made for both automated and manual adjustment of the crystal orientations.

It will be seen that the configuration of the apparatus 48 suits the aforementioned first preferred embodiment in which the axes of rotation for the crystals were respectively horizontal, vertical and horizontal. It will be further seen that each of these axes of rotation pass through the centres of the respective crystals and substantially intersect the optical axis 64 at right angles.

Provision is also made in apparatus 48 for closely controlling the temperature of each crystal 20, 22, 24. For this purpose, each holder is thermally insulated from its mounting by heat insulator cleats 94 and carries a resistive heater or a Peltier element 120, eg a Melcor heater, that is retained in a suitable recess 122 of holder 72 between cleats 94. Recess 122 is better seen in FIG. 5 for holders 72, 74. Electrical leads for the Peltier element are brought in via a tube 124 within boss 96, and the opening sealed with suitable epoxy resin. Each Peltier element acts as a heat pump shedding heat to or from the relatively massive body of the housing from or to the crystal, on application of an electrical current of the appropriate polarity. For ensuring proper management and fine control of the temperature of each crystal a respective temperature sensor (not shown) is provided in each holder and its output delivered to controller 54. It is envisioned that the Peltier element 120 may be adjusted to control the temperature of the CLBO crystals to tune for phase-matching conditions. In this way, the output energy may be optimised in a similar fashion to adjusting the angular alignment of the crystal.

The materials of the components of the apparatus 48, especially those exposed to the laser beam(s), are selected from those that do not give off gas when hit by the laser beam(s) or by reflections of the beam(s). Moreover, it will be noted that the apparatus avoids the use of rubber: it is thought from experience of an earlier design of crystal housing that the presence of rubber is adverse to the performance and/or life of the NLO crystals.

By providing individual adjustment of the crystal axis both during set up and in operation of the system, it is possible to optimise the orientations of the NLO crystals whereby to ensure stability and uniformity in the working beam. It is also thought that having the crystals at their optimum orientations optimises their efficiency and extends the working life of the crystals.

Figure 7:
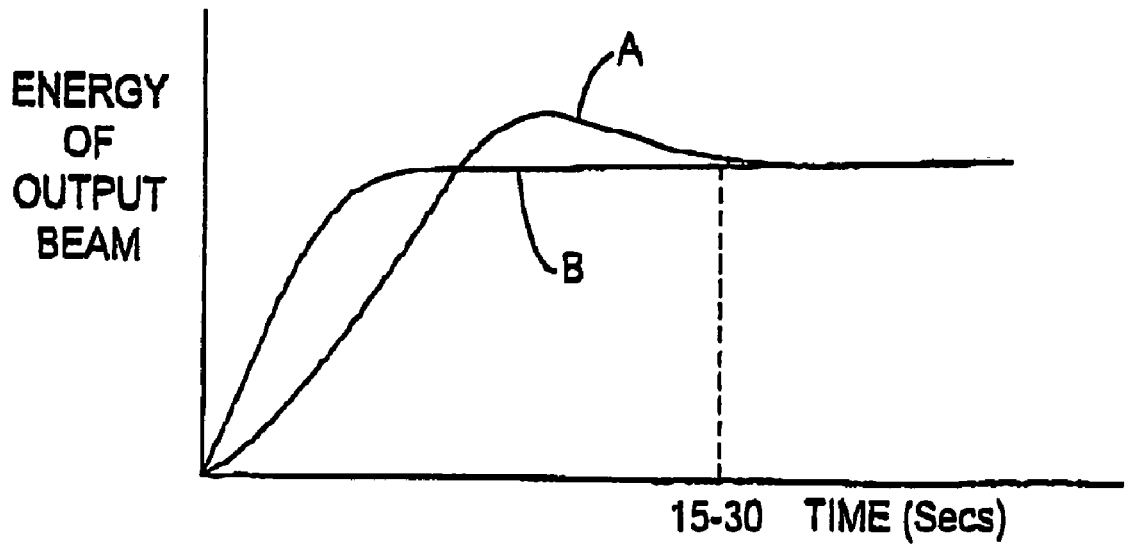
FIG. 7 is a graph depicting beam output energy during and immediately after the "warm-up" period.

In one application of the invention, provision is made for reducing the "warm-up" time for each operation carried out with the apparatus. At present, CLBO crystals typically take up to 15 to 30 seconds to stabilise their energy output. A possible explanation for this is related to absorption of the 1064 nm beam and harmonics generating heat in the crystals and thereby changing the phase-matching angle. After this warm-up time, heaters are employed to stabilise the temperature of the crystals and thereby the output beam. However, by using the heaters 120 of the illustrated apparatus to pre-heat the crystals, ie to maintain their temperature at a temperature above mean operational temperature, and by utilising energy monitor 38, it is possible to substantially shorten the "warm-up" time. When the primary laser beam is activated, a combination of a reduction of the heat applied to the preheated crystals and any necessary crystal orientation adjustment, or just one of these measures, is found to produce a stable output beam within substantially less time than the conventional 15–30 secs. This is illustrated in FIG. 7, where curve A is the prior typical shape of the energy output versus time curve at start up, and curve B is that achieved with pre-heating of the crystals 20, 22, 24. Alternatively, the crystals may be maintained at a temperature below mean operational temperature and the temperature may be increased by a few degrees to substantially shorten the "warm-up" time. A further means of avoiding warm-up time is to create a temperature gradient across the crystal, to counteract laser absorption.

Figure 8:
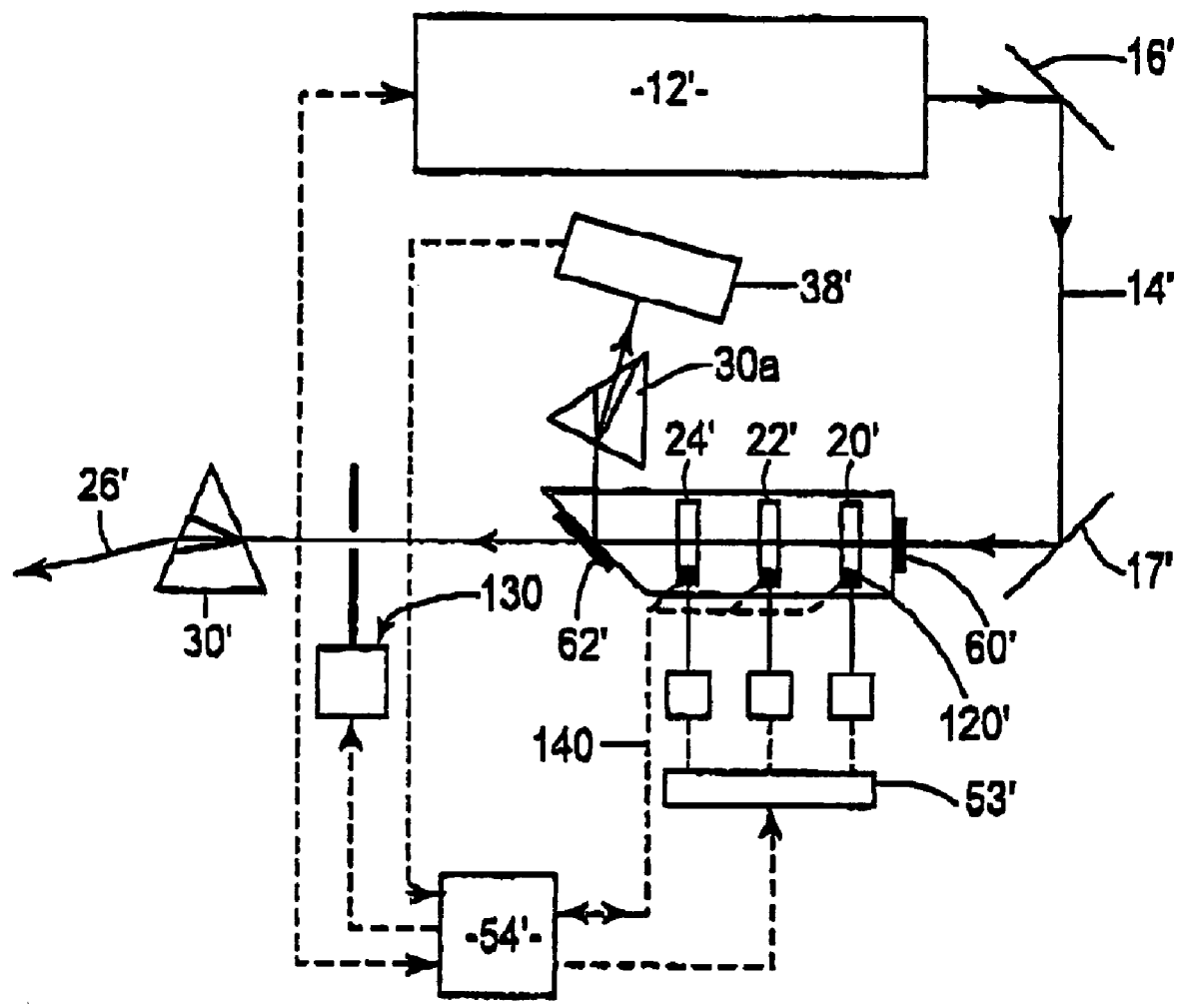
FIG. 8 is an optical diagram of an alternative embodiment of the second aspect of the invention.

FIG. 8 is an optical diagram of an alternative embodiment to that illustrated in FIG. 1. In FIG. 8 relative to FIG. 1; like parts are indicated by like primed reference numerals. FIG. 8 includes control connections 140 to crystal heaters 120 for effecting the operational embodiment just described with reference to FIG. 7.

In FIG. 8, the small fraction of the main beam reflected at the Brewster exit window 62' (which may be set away from the Brewster angle to increase the proportion reflected) is directed to a secondary prism 30a similar to prism 30', from which the 213 nm beam is received by energy monitoring photo-detector 38'. With this arrangement, computer 54' can open a shutter 130 downstream of window 62' only when the main output is known to be stabilised, and, eg, not in the warm-up period. This in turn reduces the exposure of prism 30' and significantly extends its operational life: this is less of an issue with prism 30a in view of its much lower level of exposure.

The invention claimed is:

1. Crystal housing apparatus for adjustably positioning cooperating nonlinear optical crystals in a laser beam generating system, including:
   a housing with entry and exit windows for respective laser beams;
   respective holder means to retain respective crystals of a plurality of said crystals within the housing in optical alignment with said windows;
   means mounting each of said respective holder means for individual fine rotational adjustment of each of the crystals about respective axes;
   individual temperature control elements mounted in association with the respective holder means for individually controlling the temperature of the respective crystals; and
   means for effecting said fine rotational adjustment of said crystals.

2. Crystal housing apparatus according to claim 1 wherein said axes substantially intersect said optical alignment.

3. Crystal housing apparatus according to claim 1 wherein said means for effecting said fine rotational adjustment of the crystals are respective manual means.

4. Crystal housing apparatus according to claim 1 wherein said means for effecting said fine rotational adjustment of the crystals are respective electrically powered drive means.

5. Crystal housing apparatus according to claim 4 wherein said drive means comprise stepper motors or other actuators.

6. Crystal housing apparatus according to claim 1 wherein each of said holder means includes means for clamping the crystal in at least two directions.

7. Crystal housing apparatus according to claim 6 wherein said at least two directions comprise one perpendicular to the optical alignment and the other substantially coaxial with or at least parallel to the optical alignment.

8. Crystal housing apparatus according to claim 6 wherein said clamping means is arranged to minimize stress on the crystal and to distribute the clamping force over a large area of the crystal.

9. Crystal housing apparatus according to claim 1 wherein there are three of said holder means in an arrangement for providing three crystals for deriving, from an infra-red beam, an ultra-violet beam, eg 213 nm, suitable for photo-refractive ablation of biological tissue.

10. Crystal housing apparatus according to claim 9 wherein said arrangement consists of a BBO crystal followed by two CLBO crystals, in which the axis about which said rotational adjustment is made for the middle (CLBO) crystal extends orthogonally with respect to the other two axes of adjustment, and both of these axes are orthogonal to said optical alignment.

11. Crystal housing apparatus according to claim 1 included in laser ablation apparatus.

12. Laser ablation apparatus according to claim 11, configured for performing refractive eye surgery by photo-ablation of corneal or other eye tissue.

13. Crystal housing apparatus according to claim 6 wherein there are three of said holder means in an arrangement for providing three crystals for deriving, from an infra-red beam, an ultra-violet beam, eg 213 nm, suitable for photo-refractive ablation of biological tissue.

14. Crystal housing apparatus according to claim 13 wherein said arrangement consists of a BBO crystal followed by two CLBO crystals, in which the axis about which said rotational adjustment is made for the middle (CLBO) crystal extends orthogonally with respect to the other two axes of adjustment, and both of these axes are orthogonal to aid optical alignment.

15. Crystal housing apparatus according to claim 14 included in laser ablation apparatus.

16. Laser ablation apparatus according to claim 15 configured for performing refractive eye surgery by photo-ablation of conical or other eye tissue.

17. A laser beam generation system, including:
laser means for generating a primary laser beam;
crystal housing apparatus according to any one of claims 1 to 11;
means to direct said primary laser beam along said optical alignment, said crystals being arranged to generate one or more derived laser beams by frequency conversion of said primary beam;
means to monitor the energy or other parameter of at least one of said derived laser beams; and
wherein at least one of said means mounting each of said respective holder means and said temperature control elements is responsive to effect said rotational adjustment and/or said temperature control in response to said monitoring means for optimising said monitored energy or other parameter.

18. A laser beam generation system according to claim 17 wherein said axes substantially intersect said optical alignment.

19. A laser beam generation system according to claim 17 wherein said optimizing of said monitored energy is in relation to a value of the energy.

20. A laser beam generation system according to claim 17 wherein said optimizing of said monitored energy is in relation to the epatial profile of the beam.

21. A laser beam generation system according to claim 17 wherein said optimizing of said monitored energy is in relation to the stability of the energy or the spatial profile of the beam.

22. A laser beam generation system according to claim 17 wherein said crystals generate said one or more derived laser beams as a predetermined harmonic or harmonics of the primary laser beam.

23. A laser beam generation system according to claim 17 further including means for adjusting said primary laser beam in dependence upon said monitored energy or other parameter.

24. A laser beam generation system according to claim 17 further including means for adjusting said primary laser beam in dependence upon said monitored energy or other parameter, by adjusting one or more of the cross-section or diameter of the primary laser beam, the laser beam energy, the duration of each laser beam pulse, and the repetition rate of the primary laser beam.

25. A laser beam generation system according to claim 17, further including prism or dichroic mirror means to separate out said at least one derived beam, and shutter means to control incidence of said primary laser beam on said prism means in dependence on said monitored energy or other parameter.

26. A laser beam generation system according to claim 25 wherein said monitoring means receives a sub-beam to monitor, from a position upstream of said prism means.

27. A laser beam generation system according to claim 17 included in laser ablation apparatus.

28. Laser ablation apparatus according to claim 27, configured for performing refractive eye surgery by photo-ablation of corneal or other eye tissue.

29. A method according to claim 27, wherein said axes substantially intersect said optical alignment.

30. A laser beam generation system according to claim 14 wherein said optimising of said monitored energy is in relation to the stability of the energy of the spatial profile of the beam.

31. A laser beam generation system according to claim 30 further including means for adjusting said primary laser beam in dependence upon said monitored energy or other parameter.

32. A laser beam generation system according to claim 17, wherein said harmonic conversion means comprises:
a housing with entry and exit windows for respective laser beams;
respective holder means to retain respective crystals of said plurality of crystals within the housing in optical alignment with said windows;
means mounting said respective holder means for effecting said individual fine rotational adjustment of the crystals about said respective axes; and
individual temperature control elements mounted in association with the respective holder means for controlling the temperature of the respective crystals.

33. A laser beam generation system according to claim 32 wherein there are three of said crystals for deriving, from an infra-red beam, an ultra-violet mean, eg 213 nm, suitable for photo-refractive ablation of biological tissue.

34. A laser beam generation system according to claim 33 wherein said crystals consist of a BBO crystal followed by two CLBO crystals, in which the axis about which said rotational adjustment is made for the middle (CLBO) crystal extends orthogonally with respect to the other two axes of adjustment, and both of these axes are orthogonal to said optical alignment.

35. A laser beam generation system according to claim 34 included in laser ablation apparatus.

36. Laser ablation apparatus according to claim 35, configured for performing refractive eye surgery by photo-ablation of corneal or other eye tissue.

37. A laser beam generation system according to claim 17 wherein there are three of said crystals for deriving, from an infra-red beam, an ultra-violet beam, eg 213 nm, suitable for photo-refractive ablation of biological tissue.

38. A laser beam generation system according to claim 37 wherein said crystals consist of a BBO crystal followed by two CLBO crystals, in which the axis about which said rotational adjustment is made for the middle (CLBO) crystal extends orthogonally with respect to the other two axes of adjustment, and both of these axes are orthogonal to said optical alignment.

39. A method of generating a laser beam, including
generating a primary laser beam;
directing said primary laser beam along an optical alignment traversing a plurality of non-linear optical crystals arranged to generate one or more derived laser beams by frequency conversion of said primary beam:
maintaining the temperature of the crystals;
monitoring the energy or other parameter of at least one of said derived laser beams; and
finely individually adjusting the temperature of said crystals, and finely individually rotationally adjusting said crystals about respective axes, in either case for optimising said monitored energy or other parameter.

40. A method according to claim 39, wherein said optimising of said monitored energy is in relation to a value of said energy.

41. A method according to claim 39, wherein said optimizing of said monitored energy is in relation to the spatial profile of the beam.

42. A method according to claim 39 wherein said optimizing of said monitored energy is in relation the stability of said energy or said spatial profile of the beam.

43. A method according to claim 29, further including maintaining said crystals at a non-ambient temperature immediately prior to directing the primary laser beam along said optical alignment, and adjusting said temperature and/or effecting said individual rotational adjustment, to compensate for initial heating of the crystals by said primary laser beam.

44. A method according to claim 40 wherein said optimising of said monitored energy is in relation the stability of said energy or the spatial profile of the beam.

45. Apparatus for effecting harmonic conversion of a laser beam of predetermined frequency to provide plural harmonic components of the laser beam at frequencies different from said predetermined frequency, comprising:

a housing defining a hermetically sealed chamber;
port means for expelling air or other gas from said chamber;
means defining an optical path for said laser beam and said components thereof through said housing and said chamber; and
a plurality of individual holders for retaining respective frequency conversion crystals at spaced locations in said optical path;
wherein said individual holders for the crystals are individually rotatable to finely adjust the orientations of the respective crystals.

46. Apparatus according to claim 45, further comprising means for heating each of said crystals individually in said chamber, means for monitoring the temperature of each crystal, electrical communication lines for communicating said heating means and monitoring means to the exterior of the housing, and hermetic access porting through which said communication lines pass substantially without diminishing the vacuum in said chamber.

47. Apparatus according to claim 45, wherein each of said holders includes means for clamping its respective crystal in at least two directions.

48. Apparatus according to claim 47, wherein said at least two directions comprise a first direction perpendicular to the optical alignment and a second direction substantially coaxial with or at least parallel to the optical alignment.

49. Apparatus according to claim 45, wherein there are three of said individual holders in an arrangement for providing three of said crystals for deriving, from an infra-red beam, an ultra-violet beam suitable for photo-refractive ablation of biological tissue.

50. Apparatus according to claim 49, wherein said three crystals comprise a lithium borate (LBO) crystal followed by two caesium lithium borate (CLBO) crystals, in which the axis about which said rotational adjustment is made for the middle CLBO crystal extends orthogonally with respect to the other two axes of adjustment, and both of these axes are orthogonal to the optical alignment.

51. A laser beam generation system comprising apparatus according to claim 45 for generating said laser beam, and optics to direct the generated laser beam to said apparatus.

52. A system according to claim 51, wherein said laser means comprises solid state laser generation means.

53. Laser ablation apparatus incorporating a laser beam generating system according to claim 51.

54. Laser ablation apparatus according to claim 53, configured as apparatus for performing refractive eye surgery by photo-ablation of corneal or other eye tissue.

* * * * *